United States Patent Office 3,598,820
Patented Aug. 10, 1971

3,598,820
2 - ISOTHIOURONIUM-METHYL - 3 - CARBOXYLIC ACID AMIDO-QUINOXALINE - 1,4 - DI-N-OXIDE HALIDES AND THEIR PRODUCTION
Kurt Ley, Odenthal-Globusch, Ulrich Eholzer, Cologne-Stammheim, Roland Nast, Cologne-Buchheim, Karl-Georg Metzger, Wuppertal-Elberfeld, and Dieter Fritsche, Wuppertal-Vohwinkel, Germany, assignors to Farbenfabriken Bayer Aktiengesellschaft, Leverkusen, Germany
No Drawing. Filed Oct. 2, 1968, Ser. No. 764,592
Claims priority, application Germany, Oct. 4, 1967, F 53,669
Int. Cl. C07d *51/78*
U.S. Cl. 260—250     12 Claims

ABSTRACT OF THE DISCLOSURE 2-isothiouronium-methyl-3-carboxylic acid-amido-quinoxaline-1,4-di-N-oxide halides of the formula:

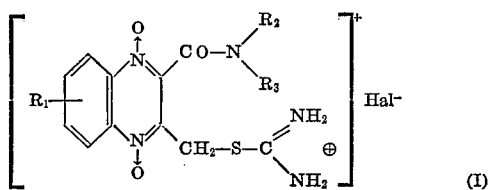

wherein $R_1$ is hydrogen, lower alkyl, lower alkoxy or chlorine,
$R_2$ is hydrogen, straight or branched chain alkyl or straight or branched chain alkyl substituted by hydroxy lower alkoxy, acyloxy, monoalkylamino or dialkylamino,
$R_3$ is hydrogen, straight or branched chain alkyl, straight or branched chain alkyl substituted by hydroxy, lower alkoxy, acyloxy, monoalkylamino or dialkylamino, or when $R_2$ is hydrogen, cyclohexyl, or $R_2$ and $R_3$ together with the amide nitrogen atom form part of a 5- or 6-menbered heterocyclic ring, and
Hal is chlorine or bromine, are useful for their antibacterial effect. These compounds may be produced, inter alia, by reacting a 2-halomethyl-3-carboxylic acid amido-quioxaline-1,4-di-N-oxide of the formula:

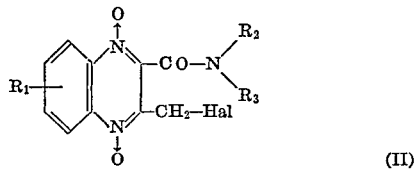

with thiourea, wherein $R_1$, $R_2$, $R_3$ and Hal are as above defined.

---

The present invention is concerned with 2-isothiouronium-methlyl-3-carboxylic acid-amido-quioxaline-1,4-di-N-oxide halides and their produciton. More particularly, these compounds can be represented by the formula:

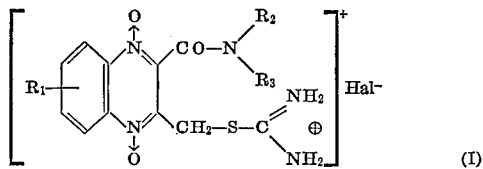

wherein:

$R_1$ is hydrogen, lower alkyl, lower alkoxy or chlorine,
$R_2$ is hydrogen, straight or branched chain alkyl or straight or branched chain alkyl substituted by hydroxy, lower alkoxy, acyloxy, monoalkylamino or dialkylamino,
$R_3$ is hydrogen, straight or branched chain alkyl, straight or branched chain alkyl substituted by hydroxy, lower alkoxy, acyloxy, monoalkylamino or dialkylamino, or when $R_2$ is hydrogen, cyclohexyl, or $R_2$ and $R_3$ together with the amide nitrogen atom form part of a 5- or 6-membered heterocyclic ring, and
Hal is chlorine or bromine.

These compounds are useful as antibacterial compounds.

The compounds of the present invention may be produced, inter alia, by reacting a 2-halomethyl-3-carboxylic acid amido-quinoxaline-1,4-di-N-oxide of the formula:

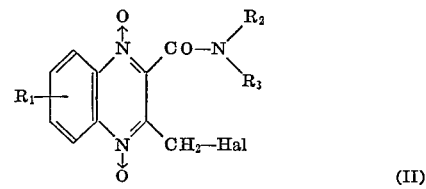

with thiourea in a suitable organic solvent at a temperature of from about 40° C. to about 160° C.

According to the present invention, the preferred lower alkyl and lower alkoxy groups for $R_1$ are those containing 1 to 4 carbon atoms. When $R_2$ and $R_3$ are alkyl, it is preferred that the alkyl moieties contain 1 to 12 carbon atoms. Particularly preferred embodiments are those wherein the alkyl groups contain from 1 to 6 carbon atoms. When the alkyl moieties of $R_2$ and $R_3$ are substituted by lower alkoxy, acyloxy, mono- or dialkylamino moieties, it is preferred that the alkyl portions of those moieties contain from 1 to 4 carbon atoms. In the case of the dialkylamino moieties, each alkyl group is preferred to contain 1 to 4 carbon atoms. Where $R_2$ and $R_3$ together with the amide nitrogen atom form a part of a heterocyclic ring, such as ring may contain, besides the amide nitrogen atom, an additional nitrogen atom or an oxygen heteroatom. When $R_2$ and $R_3$ form a 6-membered ring containing 2 heteroatoms, the second heteroatom is preferably in the para position to the amide nitrogen atom and the hydrogen atom may be substituted on the additional nitrogen atom if nitrogen is the second heteroatom by lower alkyl of 1 to 4 carbon atoms which, in turn, may itself be substituted by hydroxy, methoxy or acetoxy.

If 2-chloromethyl-3-carboxylic acid methylamidoquinoxaline-1,4-di-N-oxide and thiourea are used as starting materials, the reaction of the inveniton can be represented by the following reaction mechanism:

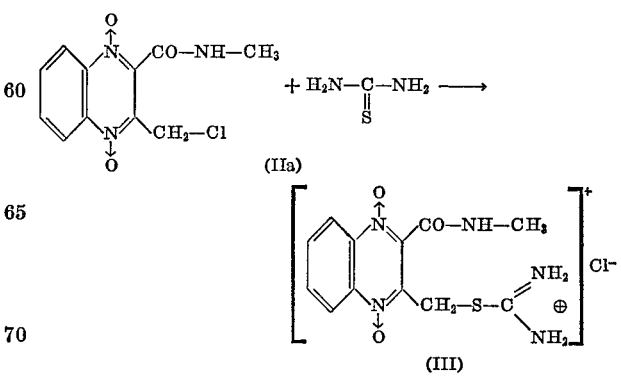

The 2-halomethyl-3-carboxylic acid amido-quinoxaline-1,4-di-N-oxides of Formula II may be obtained by halogenation of 2-methyl-3-carboxylic acid amido-quinoxaline-1,4-di-N-oxides. German application F 53667 IVd/12 p filed Oct. 4, 1967 and corresponding United States application filed concurrently herewith and designated Le A 11051–A Ser. No. 764,610, filed Oct. 2, 1968, disclosed methods for producing compound II.

As examples of the 2-halomethyl-quinoxaline-1,4-di-N-oxides which can be used according to the invention as starting compounds, there are mentioned in particular: 2-chloromethyl-3-carboxylic acid methylamido-quinoxaline-1,4-di-N-oxide, 2-chloromethyl-3-carboxylic acid butylamido-quinoxaline-1,4-di-N-oxide, 2 - chloromethyl-3-carboxylic acid-$\beta$-methoxyethylamido - quinoxaline-1,4-di-N-oxide, 2-chloromethyl-3-carboxylic acid-dimethyl-amido-quinoxaline-1,4-di-N-oxide, 2-chloromethyl-3-carboxylic acid-$\beta$-acetoxymethylamido-quinoxaline-1,4-di-N-oxide, 2-chloromethyl-3-carboxylic acid-cyclohexylamido-quinoxaline-1,4-di-N-oxide, 2-chloromethyl-3-carboxylic acid - pyrrolidylamino - quinoxaline - 1,4 - di - N - oxide, 2-bromomethyl-3-carboxylic acid-pyrrolidylamido-quinoxaline-1,4-di-N-oxide, 2-chloromethyl - 3 - carboxylic acid amide-quinoxaline-1,4-di-N-oxide, 2-chloromethyl-3-carboxylic acid-methylamido-7-methyl-quinoxaline-1,4-di-N-oxide, 2-chloromethyl-3-carboxylic acid-methylamido-7-methoxy-quinoxaline-1,4-di-N-oxide, 2-chloromethyl-3-carboxylic acid-methylamido-7-chloro-quinoxaline-1,4-di-N-oxide.

About 1 to about 1½ moles of thiourea are used per mole of 2-halomethyl-3-carboxylic acid amido-quinoxaline-1,4-di-N-oxide.

Examples of suitable diluents are alcohols, acetonitrile, nitromethane, dimethyl formamide, dioxan, tetrahydrofuran, dimethyl sulphoxide and chlorinated hydrocarbons such as chloroform, methylene chloride and chlorobenzene.

The reaction is carried out in the temperature range of about 40° C. to about 160° C., preferably 60° C. to 100° C.

The new compounds of the invention are crystalline substances, which can be isolated in the usual manner.

The antibacterial activity of the compounds of the present invention has been demonstrated both in vitro and in vivo and the compounds of the present invention have, in such tests, shown utility upon both subcutaneous as well as oral administration against acute bacterial infections. The compounds are effective against a range of both gram positive and gram negative bacteria.

The general dosage ranges of the compounds of the present invention are from about 5 mg. to about 300 mg. and preferably from about 20 mg. to about 100 mg./kg. per body weight per day. It is, however, to be appreciated that in some cases it may be necessary or desirable to administer a greater or lesser amount, which amount will be dependent upon the type of infection, the severity of the condition, the body weight of the human or animal involved, the past medical history and other factors generally taken into consideration by those administering antibacterial compounds. In the case where larger amounts are administered, it is generally advisable to divide these larger dosages into several smaller doses which may be administered during the course of the day.

The compounds of the present invention may be used either as such or may be administered in combination with known pharmaceutically acceptable carriers and diluents. Suitable as administration forms in combination with various inert carriers and diluents for the compounds of the present invention are tablets, capsules, powders, sprays, elixirs, aqueous suspensions, injectable solutions, syrups and the like. The carriers and diluents also include fillers and sterile aqueous media, as well as non-toxic organic solvents and other suitable pharmaceutical vehicles well known by those in the art. If desired, tablets, capsules or other forms used for oral administration may be provided with a sweetening additive or other suitable flavoring substance. The compounds of the present invention, which is the active ingredient in such a pharmaceutical composition, should be present in a concentration of from about 0.5 to about 90% by weight of the total composition.

For oral administration, tablets may also contain such known additives as sodium citrate, calcium carbonate, dicalcium phosphate, together with various adjuvants such as starch, preferably potato starch, and the like, and binders such as polyvinylpyrrolidine, gelatin and the like, lubricants such as magnesium stearate, sodium lauryl sulphate and talc may also be used for tablet-making. For aqueous supensions and/or elixirs which are intended for oral administration, suitable substances to improve the taste, dyestuffs, emulsifiers and/or diluents, such as water, ethanol, propylene glycol, glycerol and the like, may be added.

For solutions intended for parenteral application, the compound of the present invention may be combined with seasame oil or arachis oil or aqueous propylene glycol or N,N-dimethyl formamide may be used, as well as sterile aqueous solutions when water soluble compounds are utilized. If necessary, such aqueous solutions can be buffered in known and customary manner and the liquid diluents should be rendered isotonic beforehand by the addition of the requisite amount of salt or glucose. Such aqueous solutions are particularly suitable for intravenous, intramuscular and intraperitoneal injections. Sterile aqueous media may be prepared in manners per se known in the art.

The following data shows the effectiveness of compounds selected as representative of the class as a whole and the number of the compounds tested corresponds to the example number. These tests demonstrate the effectiveness of representative species and the genus as a whole embraces compounds having antibacterial activity already indicated.

In the animal experiments with white mice, the intraperitoneally infected animals were treated subcutaneously or orally as follows:

(1) Administration in one dose, subcutaneously or orally, of 1000 mg., 500 mg., 200 mg., 100 mg., 50 mg., 25 mg., 12.5 mg. or 6.25 mg./kg. 15 minutes before or 90 minutes after infection.

(2) Administration in two (or three) doses of 6.25 mg., 12.5 mg., 25 mg., 50 mg. or 150 mg./kg. two hours before and five hours after infection.

(3) Administration in four doses of 50 mg. or 150 mg./kg. two hours before infection, shortly before infection, 3 hours, 5 hours and/or 21 hours and 29 hours after infection.

The bacteria used for infections were *E. coli*, Klebsiella, *Staphylococcus aureus, Diplococcus pneumoniae* or *Streptoccus pyogenes, Proteus mirabilic* and *Pseudomonas aeruginosa*. The $ED_{100}$ of the most effective compounds (e.g., 1, 3 and 4) against *E. coli* C165 or *Staph. aureus* 133 lies, in the case of administration in one dose, orally or subcutaneously, between 25 mg./kg. and 100 mg./kg.

The $DL_{50}$ lies in the dosage range of about 400 mg./kg. to about 1500 mg./kg. after oral administration in one dose to mice. The substances are thus relatively non-toxic since the relatively less well tolerated ones are distinguished by higher effectiveness and are, therefore, applied only in low dosage. Also in the case of treatment of rats with 60 mg./kg. orally twice daily over 17 days, the substances were well tolerated. In the case of acute ascending infections of the urinary tract of the rat (pyclonephritis), dosages of 2 x 15 mg./kg. daily, i.e., 15 mg./kg. twice a day, over 7–10 days were applied with success and were tolerated well. In vitro, the substances act bacteriostatically and bactericidally.

The new compounds are also effectives against Mycoplasma infections in the in vitro test, amounts of about 5 to about 50$\gamma$ per ml. being used.

1.—ANIMAL EXPERIMENTS WITH THE WHITE MOUSE

| | Example Number | | | | |
|---|---|---|---|---|---|
| | 1 | 2 | 3 | 4 | 5 |
| E. coli (infection germ) | [1] 80 | [1] 100 | [1] 100 | | |
| Dose, mg./kg. oral | 2×150 | 1×100 | 1×100 | | |
| Staph. aureus (infection germ) | [1] 100 | [1] 100 | [1] 100 | [1] 100 | [1] 100 |
| Dose, mg./kg. oral | 1×250 | 1×100 | 1×250 | 1×100 | 1×100 |
| Streptococcus pyogenes (infection germ) | [1] 100 | [1] 100 | [1] 100 | | |
| Dose, mg./kg. oral | 1×100 | 1×100 | 1×100 | | |

[1] Percent surviving animals 24 hours after infection.

2.—IN VITRO EXPERIMENTS

[Minimum inhibition concentration in µg./ml. nutrient medium]

| | Example Number | | | | | |
|---|---|---|---|---|---|---|
| Germ | 1 | 2 | 3 | 4 | 5 | 6 |
| Proteus sp. | 10 | >100 | >100 | >100 | >100 | |
| Pseudomonas aerug. | 100 | >100 | >100 | 100 | >100 | |
| E. coli | 10 | 100 | 100 | >100 | >100 | |
| Klebsiella | 10 | >100 | >100 | >100 | 100 | |
| Staph. aureus | 100 | 100 | 100 | 100 | 100 | |
| Streptococcus pyog. | 10 | 100 | 10 | 100 | >100 | |

The new 2-halomethyl-3-carboxylic acid amido-quinoxaline-1,4-di-N-oxides also show (same general dosage latitude as stated above) effectivness against amoebae and flagellates (*E. histolytica, Trichomonas vaginalis, Lamblia muris*) in in vitro as well as in vivo tests on animals (e.g. mice, rats, golden hamsters).

| Ex. No. | Formula | M.P. in °C. d=decomposition | Appearance |
|---|---|---|---|
| 1 | (IV) | 210 | Pale yellow crystals. |
| 2 | (V) | 238(d) | Do. |
| 3 | (VI) | 189(d) | Do. |
| 4 | (VII) | 223(d) | Do. |
| 5 | (VIII) | 214(d) | Do. |
| 6 | (IX) | 225(d) | Do. |

The preparation of the compounds is illustrated by the following examples:

EXAMPLE 1

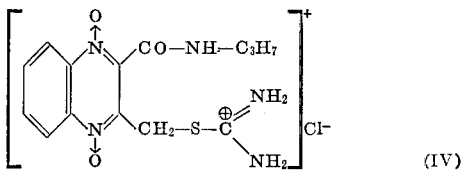

29.5 g. (0.1 mole) 2-chloromethyl-3-carboxylic acid-propylamido-quinoxaline-1,4-di-N-oxide are suspended in 200 ml. acetonitrile, 8 g. (0.1 mole) thiourea are added, and heating to the boil is effected. The starting material dissolves after a short time and the reaction product separates in crystalline form. Heating is continued for a further 2 hours, with stirring; cooling is effected, followed by suction filtration. After washing out with hot methanol, 28.5 g. (=77% of the theory) of the compound of the above formula are obtained in analytical grade form as pale-yellow crystals which melt at 210° C., with decomposition.

The other compounds, that is, those whose formulas are set forth as Examples 2 through 6 are prepared in a similar manner by reacting, respectively:

2-chloromethyl-3-carboxylic acid-amide-quinoxaline-1,4-di-N-oxide with thiourea;
2-chloromethyl-3-carboxylic acid-methylamido-quinoxaline-1,4-di-N-oxide with thiourea;
2-chloromethyl-3-carboxylic acid-isopropylamido-quinoxaline-1,4-di-N-oxide with thiourea;
2-chloromethyl-3-carboxylic acid-butylamido-quinoxaline-1,4-di-N-oxide with thiourea;
2-chloromethyl-3-carboxylic acid-tert.-butylamido-quinoxaline-1,4-di-N-oxide with thiourea.

The starting material, 2 - chloromethyl - 3 - carboxylic acid - methylamido-quinoxaline-1,4-di-N-oxide, set forth above may be obtained as described in German application F 53667 IVd/12 p filed Oct. 4, 1967 and corresponding United States application filed concurrently herewith and designatel Le A 11051–A Ser. No. 764,610, filed Oct. 2, 1968.

This procedure is generally as follows:

(A) 233 g. (1 mole) 2-methyl-3-carboxylic acid methyl-amido-quinoxaline-di-N-oxide-(1.4) are suspended in 700 ml. chloroform and heated to the boil. Into the boiling mixture there are introduced, within 3 hours, with stirring, 90 g. (2.5 gram atoms) of chlorine. First the starting material dissolves, then the reaction product separates in crystalline form. Stirring is continued for 30 minutes at boiling temperature; air is then blown into the reaction mixture for 30 minutes in order to remove the HCl which is formed, and this is followed by cooling and suction filtration. After recrystallisation from ethanol/dioxan, 181 g. (=68% of the theory) of 2-chloromethyl-3-carboxylic acid methyl-amido-quinoxaline-di-N-oxide-(1.4) are obtained as yellow crystals which melt at 195° C.– 196° C.

Analysis.—$C_{11}H_{10}ClN_3O_3$ (molecular weight 267.5). Calc. (percent): Cl, 13.3. Found (percent): Cl, 13.0.

(B) The same substance was obtained by chlorination in glacial acetic acid at 85° C.–90° C. For working up, the reaction solution obtained is poured into water. A yellow oil separates, which crystallises when rubbed with methanol. The substance shows no depression of melting point with that described under (A).

In manner analogous with that described in the above example, the other 2-halomethyl-3-carboxylic acid amido-quinoxaline-1,4-di-N-oxides used for the reaction according to the invention can also be obtained.

In addition to the new compounds and processes disclosed herein, the present invention also includes pharmaceutical compositions containing at least one compound of the present invention in combination or admixture with a solid or liquid diluent or carrier, as well as methods of treating bacterial infections. The present invention also includes unit dosage forms comprising at least one compound of the present invention either alone or in admixture or combination with a solid or liquid diluent or carrier. The compound may be suitably enveloped by a protective covering containing the compound itself and, if used, a diluent or carrier.

The term "medicament in dosage unit form" as used in the present specification means a medicament as defined above in the form of discrete portions each containing a unit dose, or a multiple or sub-multiple of a unit dose of the active compound or compounds. Such portions may, for example, be in monolithic coherent form, such as tablets, suppositories, pills or dragees; in wrapped or concealed form, such as wrapped powders, cachets, sachets, or capsules; in ampoules, either free or as a sterile solution suitable for parenteral injection; or in any other form known to the art.

What is claimed is:

1. A compound of the formula:

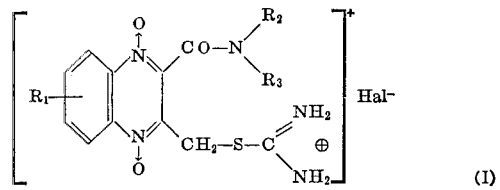

wherein:

$R_1$ is hydrogen, lower alkyl, lower alkoxy or chlorine, $R_2$ is hydrogen, straight or branched chain alkyl of 1 to 12 carbon atoms or straight or branched chain alkyl substituted by hydroxy, lower alkoxy, acyloxy of 1 to 4 carbon atoms, monoalkylamino or dialkylamino of 1 to 4 carbon atoms, $R_3$ is hydrogen, straight or branched chain alkyl of 1 to 12 carbon atoms, straight or branched chain alkyl substituted by hydroxy, lower alkoxy, acyloxy of 1 to 4 carbon atoms, monoalkylamino or dialkylamino of 1 to 4 carbon atoms, or when $R_2$ is hydrogen, cyclohexyl, or $R_2$ and $R_3$ together with the amide nitrogen atom form part of a 5- or 6-membered nitrogen containing heterocyclic ring, and Hal is chlorine or bromine.

2. A compound according to claim 1 wherein the $R_1$ lower alkyl and lower alkoxy moieties are of 1 to 4 carbon atoms, the $R_2$ and $R_3$ alkyl moieties are of 1 to 12 carbon atoms and the $R_2$ and $R_3$ lower alkoxy, acyloxy, monoalkylamino and dialkylamino moieties are of 1 to 4 carbon atoms in the alkyl moiety.

3. A compound according to claim 2 wherein the $R_2$ and $R_3$ alkyl moieties are of 1 to 6 carbon atoms.

4. A compound according to claim 2 wherein Hal is chlorine.

5. The compound:

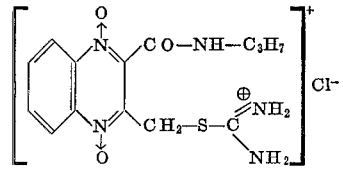

6. The compound:

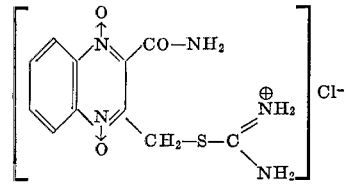

7. The compound:

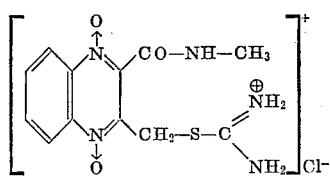

8. The compound:

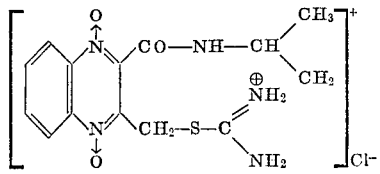

9. The compound:

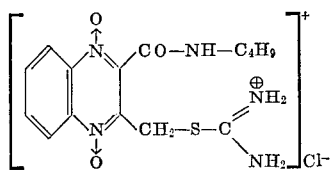

10. The compound:

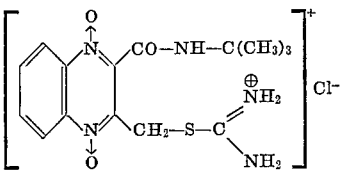

11. A process for the production of a compound of claim 1 which comprises reacting in the presence of an organic reaction solvent at a temperature of about 40° C. to about 160° C. a compound of the formula:

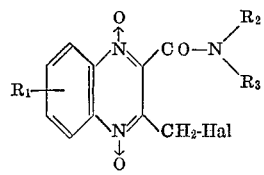

wherein:

$R_1$ is hydrogen, lower alkyl, lower alkoxy or chlorine, $R_2$ is hydrogen, straight or branched chain alkyl of 1 to 12 carbonatoms or straight or branched chain alkyl substituted by hydroxy, lower alkoxy, acyloxy of 1 to 4 carbon atoms, monoalkylamino or dialkylamino of 1 to 4 carbon atoms, $R_3$ is hydrogen, straight or branched chain alkyl of 1 to 12 carbon atoms, straight or branched chain alkyl substituted by hydroxy, lower alkoxy, acyloxy of 1 to 4 carbon atoms, monoalkylamino or dialkylamino of 1 to 4 carbon atoms, or when $R_2$ is hydrogen, cyclohexyl, or $R_2$ and $R_3$ together with the amide nitrogen atom form part of a 5- or 6-membered heterocyclic ring, and Hal is chlorine or bromine, with thiourea and recovering the compound produced.

12. A process according to claim 11 wherein the temperature is from about 60° C. to about 100° C.

References Cited

UNITED STATES PATENTS 3,157,654  1/1964  Sasse et al. _____ 260—250

NICHOLAS S. RIZZO, Primary Examiner

U.S. Cl. X.R.

424—250